(12) United States Patent
Miyazaki

(10) Patent No.: US 12,370,888 B2
(45) Date of Patent: Jul. 29, 2025

(54) ELECTRIC WORK VEHICLE

(71) Applicant: Kubota Corporation, Osaka (JP)

(72) Inventor: Daisuke Miyazaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/911,585

(22) Filed: Oct. 10, 2024

(65) Prior Publication Data
US 2025/0033466 A1 Jan. 30, 2025

Related U.S. Application Data

(63) Continuation of application No. 17/783,424, filed as application No. PCT/JP2020/038691 on Oct. 14, 2020, now Pat. No. 12,179,586.

(30) Foreign Application Priority Data

Dec. 26, 2019 (JP) ................................. 2019-237394

(51) Int. Cl.
B60K 25/06 (2006.01)
B60K 1/00 (2006.01)
B60K 1/04 (2019.01)
B60K 25/00 (2006.01)

(52) U.S. Cl.
CPC ............... B60K 25/06 (2013.01); B60K 1/00 (2013.01); B60K 1/04 (2013.01); B60K 2025/005 (2013.01); B60Y 2200/223 (2013.01)

(58) Field of Classification Search
CPC .. B60K 2025/005; B60K 17/28; B60K 17/35; B60K 25/06; B60K 1/04; B60K 1/00; B60K 25/00; B60W 2300/152; B60W 10/30; B60W 10/08
See application file for complete search history.

(56) References Cited

U.S. PATENT DOCUMENTS

| | | | | |
|---|---|---|---|---|
| 1,055,619 A | * | 3/1913 | Dunn | F16H 61/444 60/483 |
| 1,609,833 A | * | 12/1926 | Robson | F16H 39/14 105/62.1 |
| 4,233,858 A | * | 11/1980 | Rowlett | B60K 6/30 290/22 |
| 4,359,909 A | * | 11/1982 | Sogo | F16N 7/16 184/6.12 |
| 5,046,306 A | * | 9/1991 | Borre, Jr. | F16N 7/32 60/39.08 |
| RE34,833 E | * | 1/1995 | Hasegawa | B60K 17/28 475/83 |

(Continued)

OTHER PUBLICATIONS

Miyazaki, "Electric Work Vehicle", U.S. Appl. No. 17/783,424, filed Jun. 8, 2022.

Primary Examiner — Timothy Wilhelm
(74) Attorney, Agent, or Firm — Keating & Bennett, LLP

(57) ABSTRACT

An electric work vehicle includes a work implement, a battery, a motor driven by electric power supplied by the battery, a traveler driven by the motor, a hydraulic pump that is driven by the motor to supply oil to an operating mechanism of the work implement, a transmission to transmit motive power from the motor to the hydraulic pump, and a case that houses the transmission. The case is coupled to the motor, and the hydraulic pump is supported by the case.

13 Claims, 5 Drawing Sheets

(56) References Cited

U.S. PATENT DOCUMENTS

| | | | | |
|---|---|---|---|---|
| 5,406,778 | A * | 4/1995 | Lamb | A01D 34/44 56/11.9 |
| 5,557,977 | A * | 9/1996 | Stockton | F16H 47/085 475/47 |
| 5,564,518 | A * | 10/1996 | Ishii | B60K 17/344 74/665 F |
| 5,644,954 | A * | 7/1997 | Matsufuji | F16H 57/0421 74/606 R |
| 6,044,921 | A * | 4/2000 | Lansberry | B60G 11/02 180/6.48 |
| 6,048,288 | A * | 4/2000 | Tsujii | B60W 10/30 903/910 |
| 6,109,009 | A * | 8/2000 | Benson | B60L 58/21 56/10.2 G |
| 6,860,358 | B1 * | 3/2005 | Hauser | B60K 17/105 180/305 |
| 6,964,631 | B2 * | 11/2005 | Moses | F16H 61/0031 180/65.265 |
| 7,229,256 | B1 * | 6/2007 | Hauser | F04B 1/22 417/269 |
| 7,421,917 | B2 * | 9/2008 | Nishino | B60K 17/105 74/15.82 |
| 7,713,157 | B2 * | 5/2010 | Hastings | H02K 7/116 475/5 |
| 7,726,275 | B2 * | 6/2010 | Deniston | F02B 67/06 123/198 C |
| 8,055,399 | B2 * | 11/2011 | Wyatt | B60L 15/00 701/50 |
| 8,092,326 | B2 * | 1/2012 | Amanuma | F16H 55/36 474/84 |
| 8,221,284 | B2 * | 7/2012 | Asao | H02K 7/108 180/53.8 |
| 8,448,541 | B2 * | 5/2013 | Kasuya | B60L 50/16 180/65.245 |
| 8,511,216 | B2 * | 8/2013 | Sasahara | F04B 1/20 91/506 |
| 8,616,310 | B2 * | 12/2013 | Lopez | B62D 49/00 180/53.3 |
| 8,649,925 | B2 * | 2/2014 | Light | G16Z 99/00 180/65.21 |
| 8,653,704 | B2 * | 2/2014 | Atarashi | H02K 9/19 310/58 |
| 8,678,784 | B2 * | 3/2014 | Atarashi | B60K 6/26 417/372 |
| 8,689,759 | B2 * | 4/2014 | Schultz | F02N 11/003 123/179.31 |
| 8,808,124 | B2 * | 8/2014 | Major | B60K 25/00 180/65.265 |
| 8,840,511 | B2 * | 9/2014 | Seno | F16H 57/0423 184/6.12 |
| 8,905,885 | B2 * | 12/2014 | Yamamoto | B60K 6/26 184/6.12 |
| 8,939,240 | B2 * | 1/2015 | Wehrwein | B60W 10/30 180/53.8 |
| 8,961,360 | B2 * | 2/2015 | Ooiso | B60L 3/0023 475/331 |
| 8,972,139 | B2 * | 3/2015 | Shinohara | B60W 30/18109 701/22 |
| 9,022,174 | B2 * | 5/2015 | Takagi | F16H 57/0476 184/6.12 |
| 9,033,074 | B1 * | 5/2015 | Gates | F16D 11/10 180/53.6 |
| 9,145,054 | B1 * | 9/2015 | Xykis | F16H 7/06 |
| 9,150,090 | B2 * | 10/2015 | Hiyoshi | B60K 17/046 |
| 9,156,348 | B1 * | 10/2015 | Swales | B60K 1/00 |
| 9,210,839 | B2 * | 12/2015 | Schygge | B60L 50/60 |
| 9,263,975 | B2 * | 2/2016 | Wang | A01D 34/78 |
| 9,266,423 | B2 * | 2/2016 | Hoshinoya | B60K 6/48 |
| 9,301,443 | B2 * | 4/2016 | Hashima | B60W 30/18 |
| 9,487,086 | B2 * | 11/2016 | Collett | B60K 25/06 |
| 9,500,197 | B2 * | 11/2016 | Schultz | F16H 57/0439 |
| 9,638,076 | B2 * | 5/2017 | Nitta | F16H 57/0439 |
| 9,671,016 | B2 * | 6/2017 | Nakayama | F16H 48/27 |
| 9,677,246 | B2 * | 6/2017 | Yoshizawa | B60K 6/54 |
| 9,726,057 | B2 * | 8/2017 | Yamauchi | H02K 7/116 |
| 9,745,720 | B2 * | 8/2017 | Naito | B60K 6/365 |
| 9,751,411 | B2 * | 9/2017 | Benjey | B60L 53/53 |
| 9,765,870 | B1 * | 9/2017 | Fox | F04B 1/26 |
| 9,809,186 | B2 * | 11/2017 | Hoshinoya | B60K 7/0007 |
| 9,845,856 | B2 * | 12/2017 | Gutteridge | B60K 17/28 |
| 9,878,616 | B2 * | 1/2018 | Dalum | B60K 25/00 |
| 9,878,748 | B2 * | 1/2018 | Hellholm | B62D 55/084 |
| 9,919,578 | B2 * | 3/2018 | Yan | F16H 7/02 |
| 9,933,066 | B2 * | 4/2018 | Sada | F16H 57/04 |
| 9,945,464 | B2 * | 4/2018 | Hirase | F16H 47/04 |
| 10,099,552 | B2 * | 10/2018 | Long | F16H 57/082 |
| 10,106,027 | B1 * | 10/2018 | Keller | B60K 1/02 |
| 10,202,032 | B2 * | 2/2019 | Faget | F02N 15/02 |
| 10,207,576 | B2 * | 2/2019 | Makino | B60K 17/046 |
| 10,239,534 | B2 * | 3/2019 | Amigo | B60W 10/08 |
| 10,358,040 | B1 * | 7/2019 | Keller | B60K 11/02 |
| 10,458,533 | B2 * | 10/2019 | Ono | F16H 57/0476 |
| 10,539,224 | B2 * | 1/2020 | Hori | F16H 57/0456 |
| 10,563,761 | B2 * | 2/2020 | Daiyakuji | F16H 47/02 |
| 10,690,234 | B1 * | 6/2020 | Oury, Jr. | B60K 11/02 |
| 10,738,878 | B2 * | 8/2020 | Kiyokami | F16H 57/0441 |
| 10,744,862 | B2 * | 8/2020 | Sekiguchi | B60K 25/00 |
| 10,920,871 | B2 * | 2/2021 | Kita | F16H 57/0483 |
| 10,948,070 | B2 * | 3/2021 | Kuhl | F16H 57/0476 |
| 10,974,724 | B1 * | 4/2021 | Shively | B60K 6/52 |
| 10,989,297 | B2 * | 4/2021 | Guarino | F16H 57/0471 |
| 10,998,796 | B2 * | 5/2021 | Ikemoto | H02K 5/203 |
| 11,054,018 | B2 * | 7/2021 | Hori | F16H 57/0434 |
| 11,084,369 | B2 * | 8/2021 | Watt | B60K 6/405 |
| 11,192,444 | B2 * | 12/2021 | Hashimoto | B60W 10/30 |
| 11,287,026 | B2 * | 3/2022 | Umeki | B60K 6/445 |
| 11,300,036 | B2 * | 4/2022 | Goto | F01P 7/048 |
| 11,353,103 | B2 * | 6/2022 | Kawanishi | H02K 7/116 |
| 11,415,028 | B2 * | 8/2022 | Hori | B60W 10/04 |
| 11,541,749 | B2 * | 1/2023 | Nishizawa | B60K 17/24 |
| 11,578,798 | B2 * | 2/2023 | Nakata | F16H 57/0483 |
| 11,754,169 | B1 * | 9/2023 | Guarino | F16H 57/0424 74/467 |
| 12,179,586 | B2 * | 12/2024 | Miyazaki | B60K 1/00 |
| 2003/0188909 | A1 * | 10/2003 | Ohashi | B60K 25/00 180/300 |
| 2006/0059879 | A1 * | 3/2006 | Edmond | A01D 34/78 56/6 |
| 2006/0076193 | A1 * | 4/2006 | Ruther | F16H 57/0456 184/6.12 |
| 2006/0260303 | A1 * | 11/2006 | Ishii | B60K 17/10 60/487 |
| 2008/0152517 | A1 * | 6/2008 | Ishii | B60K 17/10 417/423.5 |
| 2011/0190083 | A1 * | 8/2011 | Harrison, III | F16H 7/02 474/101 |
| 2012/0277944 | A1 * | 11/2012 | Kaneko | B60L 50/10 903/930 |
| 2013/0157808 | A1 * | 6/2013 | Treichel | B60K 6/46 475/5 |
| 2014/0155214 | A1 * | 6/2014 | Kimura | F16H 57/045 475/160 |
| 2014/0158467 | A1 * | 6/2014 | Kimura | F01M 5/002 184/6 |
| 2016/0129786 | A1 * | 5/2016 | Petersen | B60K 17/28 192/85.01 |
| 2016/0145833 | A1 * | 5/2016 | Abdel-Baqi | E02F 9/2217 180/53.4 |
| 2016/0207519 | A1 * | 7/2016 | Hata | B60W 10/30 |
| 2017/0009771 | A1 * | 1/2017 | Reul | F04D 29/22 |
| 2018/0106357 | A1 * | 4/2018 | Kawakami | F16H 57/0423 |
| 2018/0106359 | A1 * | 4/2018 | Kawakami | F16H 57/0423 |
| 2018/0274660 | A1 * | 9/2018 | Kita | F16H 57/0445 |
| 2018/0334025 | A1 * | 11/2018 | Hashimoto | B60K 1/02 |
| 2022/0234434 | A1 * | 7/2022 | Tottori | B60L 58/26 |
| 2022/0377959 | A1 * | 12/2022 | Nakayama | B60L 50/60 |

\* cited by examiner

ELECTRIC WORK VEHICLE

BACKGROUND OF THE INVENTION

1. Field of the Invention

The present invention relates to an electric work vehicle that includes a battery, a motor driven by electric power supplied from the battery, and a traveling device driven by the motor.

2. Description of the Related Art

A work vehicle described in JP 2018-69926A ("tractor" in JP 2018-69926A) includes an engine and a traveling device ("front wheels" and "rear wheels" in JP 2018-69926A) that is driven by the engine.

SUMMARY OF THE INVENTION

In the work vehicle described in JP 2018-69926A, it is conceivable to provide a battery and a motor in place of the engine. This makes it possible for the vehicle to travel without emitting exhaust gas.

Furthermore, in the work vehicle described in JP 2018-69926A, it is conceivable to provide a hydraulic pump that is driven by a motor and supplies oil to an operating mechanism of a work device.

However, in this case, depending on the arrangement of the motor and the hydraulic pump, it is envisioned that the motive power transmission path from the motor to the hydraulic pump may be relatively long. As a result, motive power transmission loss is relatively high in the motive power transmission path.

Also, if a dedicated member is provided in order to support the hydraulic pump, the manufacturing cost tends to increase.

Preferred embodiments of the present invention provide electric work vehicles in each of which a motive power transmission loss from a motor to a hydraulic pump is relatively small, and furthermore the manufacturing cost can be reduced.

An electric work vehicle according to one aspect of a preferred embodiment of the present invention includes a work implement, a battery, a motor to be driven by electric power supplied by the battery, a traveler to be driven by the motor, a hydraulic pump to be driven by the motor and supply oil to an operating mechanism of the work implement, a transmission to transmit motive power from the motor to the hydraulic pump, and a case to house the transmission, wherein the case is coupled to the motor, and the hydraulic pump is supported by the case.

According to the above aspect of a preferred embodiment of the present invention, the motor and the case are relatively close to each other. Also, the hydraulic pump and the case are relatively close to each other. For this reason, the motor and the hydraulic pump are relatively close to each other. Accordingly, the motive power transmission path from the motor to the hydraulic pump is relatively short. As a result, motive power transmission loss from the motor to the hydraulic pump is relatively small.

Also, according to the above aspect of a preferred embodiment of the present invention, the hydraulic pump is supported by the case. For this reason, there is no need to provide a dedicated component in order to support the hydraulic pump. Accordingly, the manufacturing cost can be lower than in the case where a dedicated member is provided in order to support the hydraulic pump.

In other words, according to the above aspect of a preferred embodiment of the present invention, it is possible to provide an electric work vehicle in which the motive power transmission loss from the motor to the hydraulic pump is relatively small, and furthermore the manufacturing cost can be reduced.

In another aspect of a preferred embodiment of the present invention, it is preferable that the case includes a first portion and a second portion that are adjacent to each other in a front-rear direction of a body of the electric work vehicle, the first portion and the second portion are coupled to each other, the first portion is located on one side in the front-rear direction of the body relative to the second portion, the motor and the hydraulic pump are located on the one side in the front-rear direction of the body relative to the first portion, and the second portion is separable from the first portion toward another side in the front-rear direction of the body.

According to this configuration, it is not necessary to remove the motor and the hydraulic pump from the case when separating the second portion from the first portion. Also, by separating the second portion from the first portion, the worker can access the transmission. This makes it possible to perform maintenance on the transmission.

Accordingly, with the above configuration, maintenance can be easily performed on the transmission.

In another aspect of a preferred embodiment of the present invention, it is preferable that the electric work vehicle further includes left and right main frames that extend in the front-rear direction of the body, wherein the left and right main frames each include an end portion on the other side in the front-rear direction of the body, the end portions being connected to an end portion of the first portion on the one side in the front-rear direction of the body, the motor is located at a position between the left and right main frames, and the first portion supports the motor in a cantilevered state and supports the hydraulic pump in a cantilevered state.

According to this configuration, the motor is located at a position located between the left and right main frames. For this reason, it is possible to realize a configuration in which the motor is protected by the left and right main frames.

Also according to the above configuration, the first portion is connected to the main frames. For this reason, the first portion is stably supported by the main frames. Also, the motor and the hydraulic pump are supported by the first portion. Accordingly, the motor and the hydraulic pump are stably supported.

In another aspect of a preferred embodiment of the present invention, it is preferable that the electric work vehicle further includes a plurality of fasteners, wherein the fasteners each fasten together the motor, the first portion, and the second portion, in a rear view, the fasteners are aligned in a circumferential direction of a motor output shaft that is an output shaft of the motor, and are centered around the motor output shaft, and the transmission extends through a space between two of the fasteners that are adjacent to each other in the circumferential direction of the motor output shaft.

According to this configuration, a plurality of fasteners are aligned in the circumferential direction of the motor output shaft and are centered around the motor output shaft. For this reason, the motor is stably coupled to the case by the fasteners.

Also, according to the above configuration, the fasteners each fasten together the motor, the first portion, and the second portion. For this reason, the width of the case in the front-rear direction of the body can be smaller than in a configuration in which a structure for fastening the motor to the first portion and a structure to fasten the first portion to the second portion are provided separately.

Moreover, the transmission extends through a space between two of the fasteners that are adjacent to each other in the circumferential direction of the motor output shaft. Accordingly, the fasteners do not interfere with the transmission, and motive power from the motor is reliably transmitted to the hydraulic pump by the transmission.

In another aspect of a preferred embodiment of the present invention, it is preferable that the transmission includes a gear.

According to this configuration, noise generated by the driving of the transmission can be smaller than in the case where the transmission is configured to transmit motive power via a chain.

Also, according to this configuration, the width of the transmission in the direction in which the output shaft of the motor extends can be smaller than in the case where the transmission is configured to transmit power via a bevel gear and a rotation shaft. This therefore makes it possible to reduce the width of the case in the direction in which the output shaft of the motor extends.

In another aspect of a preferred embodiment of the present invention, it is preferable that the case is configured to store oil.

According to this configuration, the transmission is lubricated by the oil stored inside the case. Accordingly, the transmission is driven smoothly.

In another aspect of a preferred embodiment of the present invention, it is preferable that the electric work vehicle further includes an oil supply passage that connects the case and the hydraulic pump, wherein the oil stored in the case is supplied to the hydraulic pump via the oil supply passage.

According to this configuration, oil that is to be supplied to the operating mechanism of the work implement can be stored inside the case. In other words, the case can be used as an oil tank. Accordingly, the manufacturing cost can be lower than in the case where a dedicated component is provided for storing oil.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a plan view showing a configuration of a case and the like.

FIG. 3 is a left side view showing the configuration of the case and the like.

FIG. 4 is a longitudinal sectional rear view showing a configuration of a transmission device and the like.

FIG. 6 is an exploded perspective view showing the configuration of the case and the like.

DETAILED DESCRIPTION OF THE PREFERRED EMBODIMENTS

Figure 1:
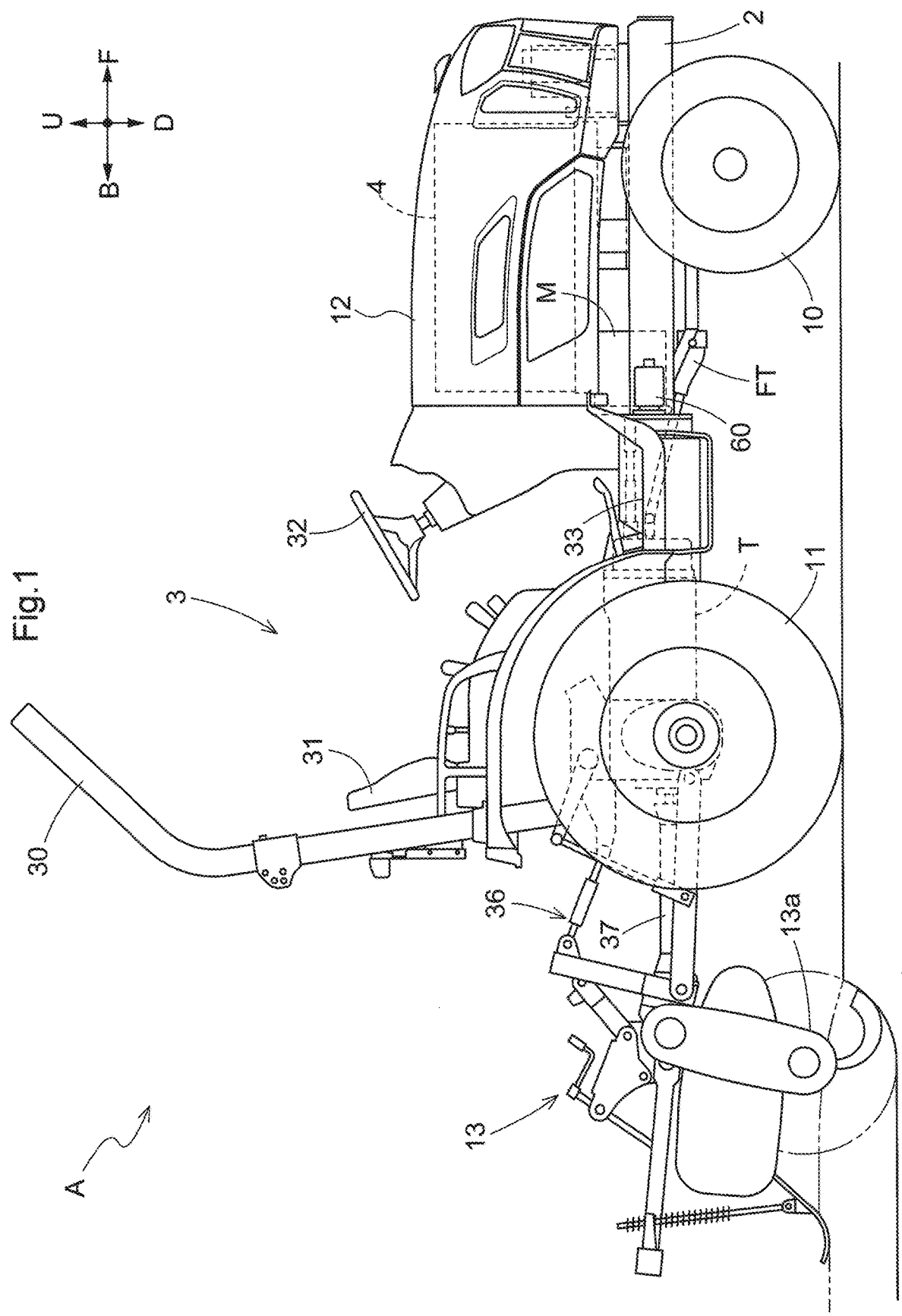
FIG. 1 is a right side view of a tractor.
Figure 2:
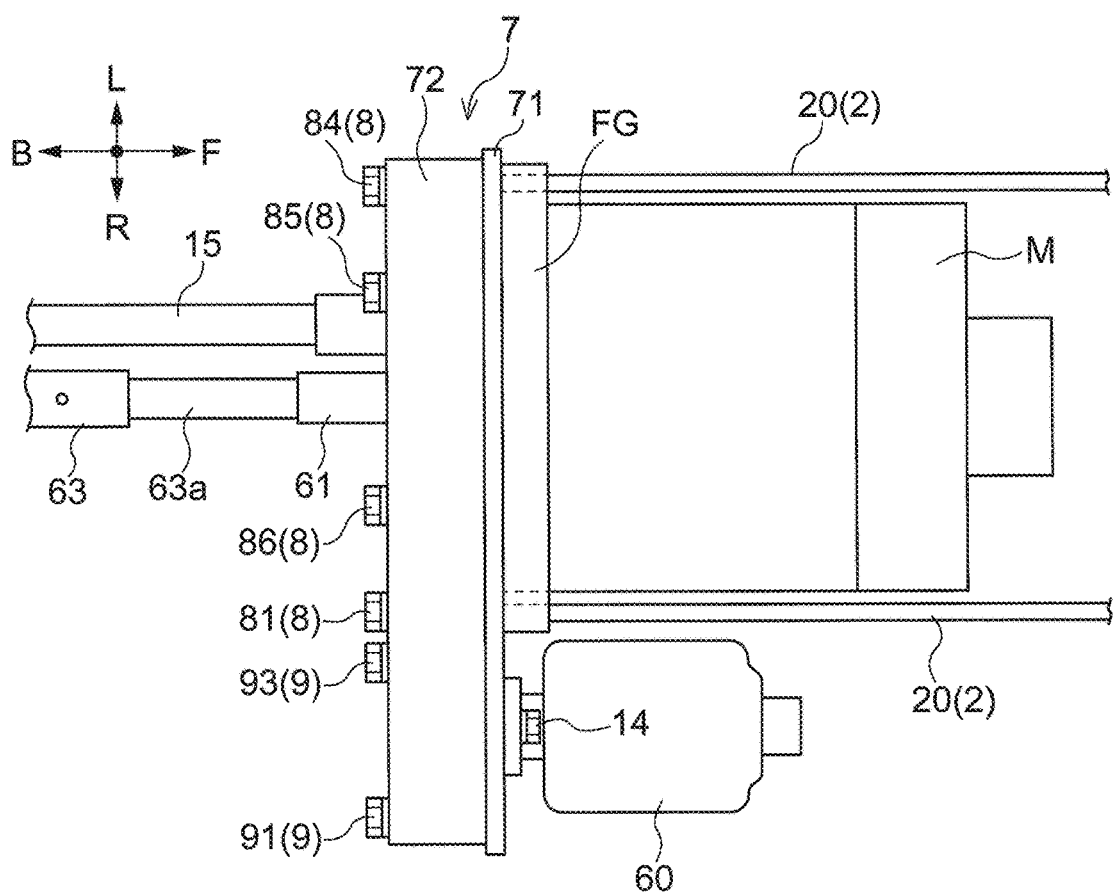
Figure 3:
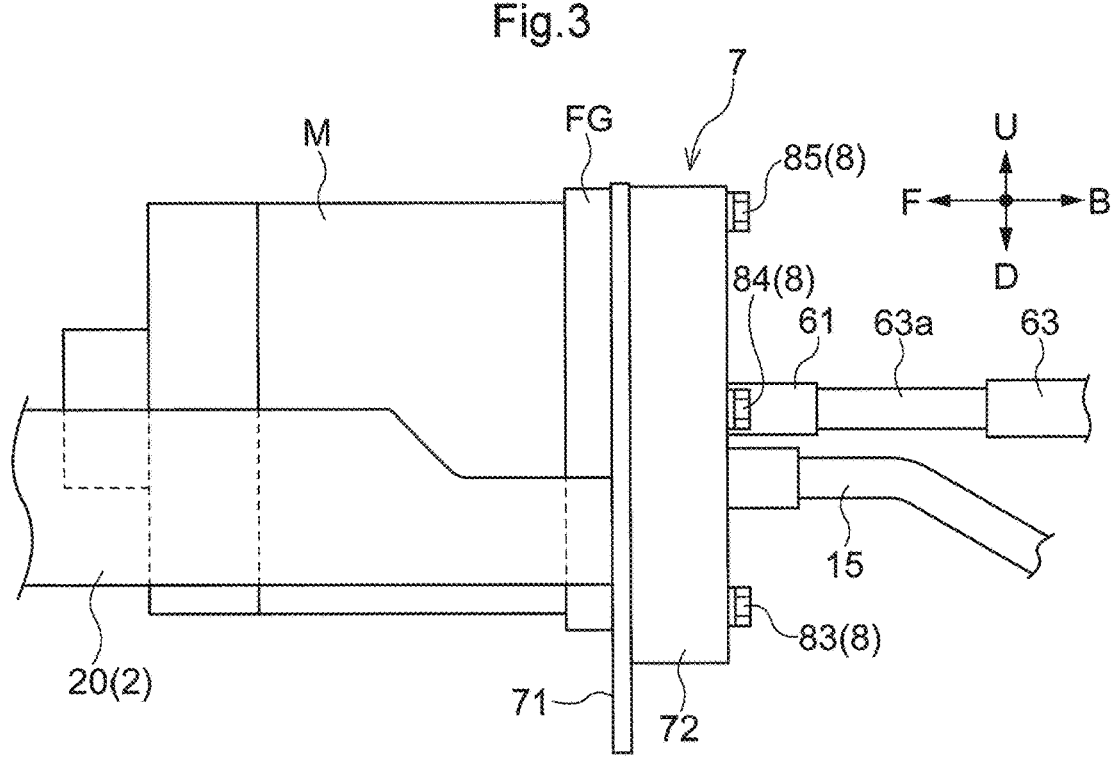
Figure 4:
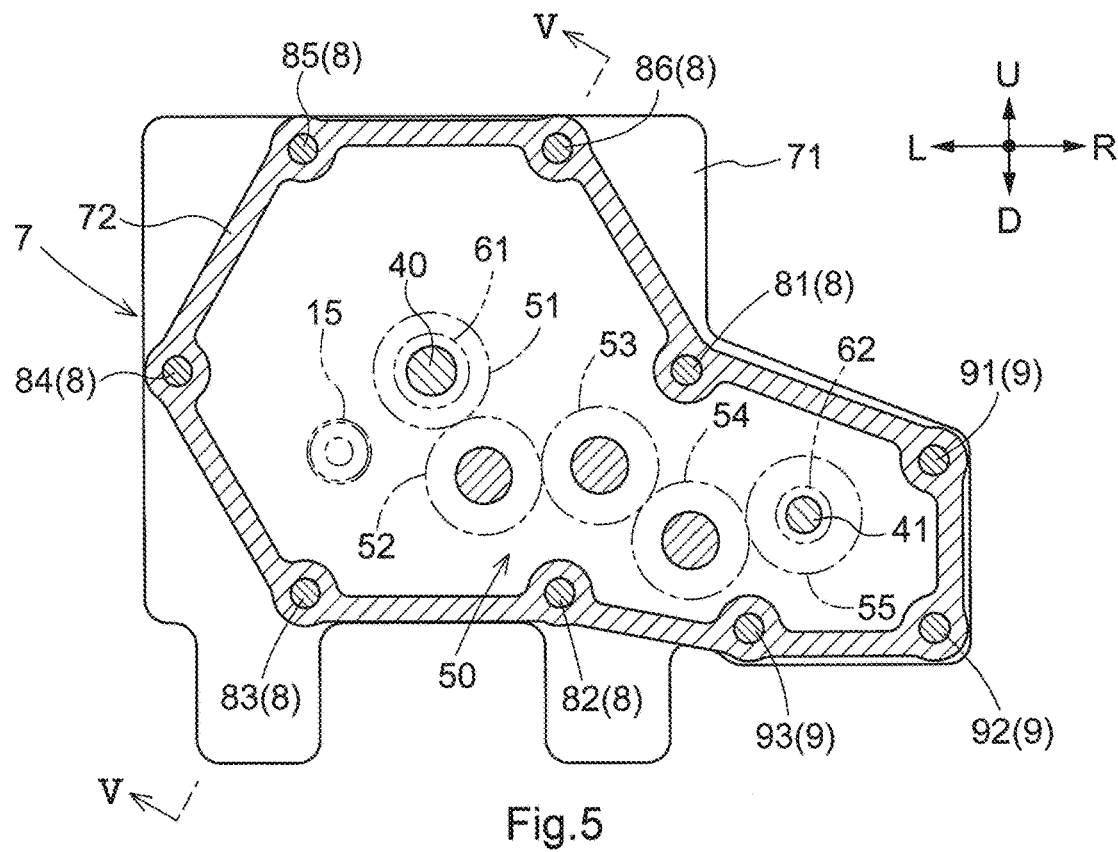

The following describes preferred embodiments of the present invention with reference to the drawings. In the following description, the directions of an arrow F and an arrow B in FIGS. 1 to 3 and 5 are respectively the forward direction and the rearward direction, and the directions of an arrow L and an arrow R in FIGS. 2 and 4 are respectively the leftward direction and the rightward direction. Also, the directions of an arrow U and an arrow D in FIGS. 1, 3 and 4 are respectively the upward direction and the downward direction.

As shown in FIG. 1, a tractor A (corresponding to an "electric work vehicle") includes left and right front wheels 10 (corresponding to a "traveler"), left and right rear wheels 11 (corresponding to a "traveler"), a cover member 12, and a cultivating device 13 (corresponding to a "work implement").

The tractor A also includes a body frame 2 and a driver section 3.

The body frame 2 is supported by the left and right front wheels 10 and the left and right rear wheels 11. Also, the cultivating device 13 is supported by a rear portion of the body frame 2.

The cover member 12 is arranged in a front portion of the body. The driver section 3 is provided rearward of the cover member 12.

The driver section 3 includes a protective frame 30, a driver seat 31, a steering wheel 32, and a floor 33. A worker can sit in the driver seat 31. The worker can perform various types of driving operations in the driver section 3.

The left and right front wheels 10 are steered by operating the steering wheel 32. The worker can also place their feet on the floor 33 while seated in the driver seat 31.

The tractor A also includes a battery 4, a motor M, a speed change device T, and a front transmission mechanism FT.

The battery 4 is housed in the cover member 12. The battery 4 supplies electric power to the motor M.

The motor M is arranged below the battery 4. The motor M is driven by electric power supplied by the battery 4. Driving force from the motor M is transmitted to the speed change device T.

The speed change device T is arranged at a location that is rearward of the battery 4 and behind the motor M. The front transmission mechanism FT extends forward from the speed change device T. The speed change device T changes driving force received from the motor M and transmits the resulting driving force to the left and right rear wheels 11. Driving force is also transmitted from the speed change device T to the left and right front wheels 10 via the front transmission mechanism FT. Accordingly, the left and right front wheels 10 and the left and right rear wheels 11 are driven.

In other words, the tractor A includes the motor M that is driven by electric power supplied from the battery 4. The tractor A also includes the left and right front wheels 10 and the left and right rear wheels 11 that are driven by the motor M.

The speed change device T transmits a portion of driving force received from the motor M to the cultivating device 13. Accordingly, the cultivating device 13 is driven.

According to the above configuration, cultivating work can be performed by the cultivating device 13 while the tractor A travels with use of the left and right front wheels 10 and the left and right rear wheels 11.

As shown in FIGS. 2 and 3, the body frame 2 includes left and right main frames 20. The left and right main frames 20 extend in the front-rear direction of the body.

In other words, the tractor A includes the left and right main frames 20 that extend in the front-rear direction of the body.

The motor M is arranged between the left and right main frames 20.

As shown in FIGS. 1 and 2, the tractor A includes a hydraulic pump 60. The hydraulic pump 60 is driven by the motor M. The hydraulic pump 60 supplies oil to an operating mechanism that operates the cultivating device 13. The cultivating device 13 can be operated by controlling the supply of oil.

More specifically, the tractor A includes an elevation mechanism 36, which is an operating mechanism of the work device. The hydraulic pump 60 supplies oil to the elevation mechanism 36. The elevation mechanism 36 operates using such oil. The cultivating device 13 is raised and lowered by the operation of the elevation mechanism 36. A drive section of a cultivating section 13a of the cultivating device 13 is connected to a PTO shaft 37 of the tractor A. The cultivating section 13a can perform cultivating work with use of motive power received from the PTO shaft 37.

In other words, the tractor A includes the hydraulic pump 60 that is driven by the motor M and supplies oil to the elevation mechanism 36 of the cultivating device 13.

Figure 5:
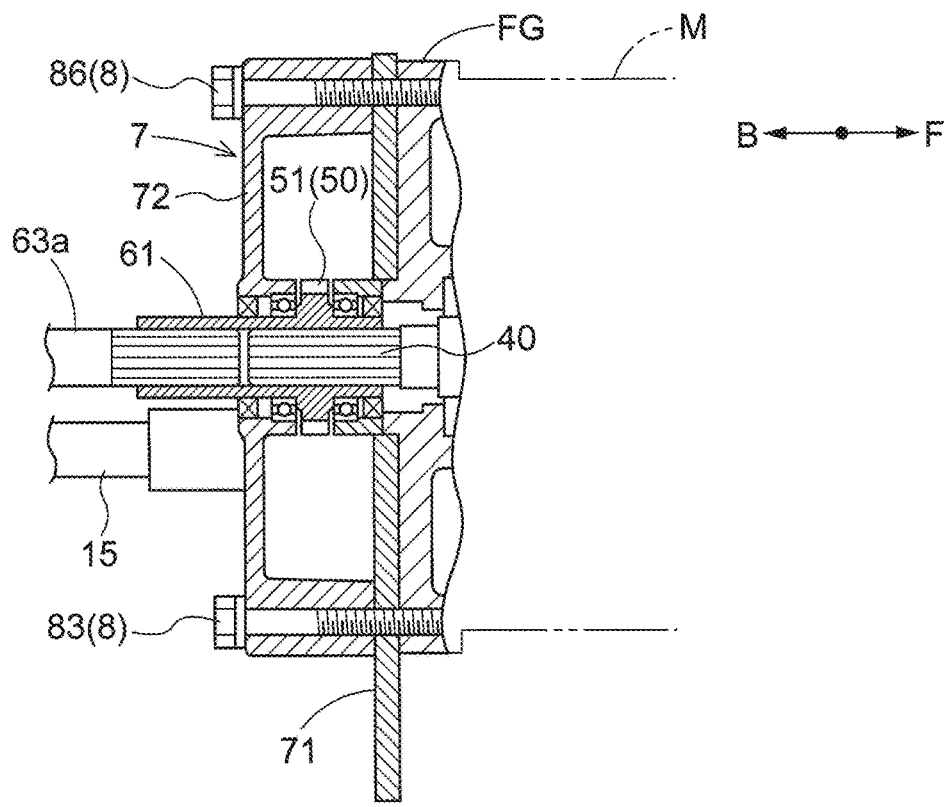
FIG. 5 is a cross-sectional view along arrows V-V in FIG. 4.

As shown in FIGS. 4 and 5, a motor output shaft 40, which is the output shaft of the motor M, is inserted into a first cylindrical shaft 61 and spline-fitted with the first cylindrical shaft 61.

As shown in FIGS. 2 and 3, a transmission input shaft 63, which is the input shaft of the speed change device T, includes a motor coupling portion 63a. The motor coupling portion 63a is provided in the front end portion of the transmission input shaft 63.

As shown in FIG. 5, the motor coupling portion 63a is inserted into the first cylindrical shaft 61 and spline-fitted with the first cylindrical shaft 61.

According to the above configuration, the first cylindrical shaft 61 and the transmission input shaft 63 integrally rotate together with the motor output shaft 40. Motive power from the motor M is thus input to the speed change device T.

Note that the motor output shaft 40, the first cylindrical shaft 61, and the transmission input shaft 63 all extend in the front-rear direction of the body.

Figure 6:
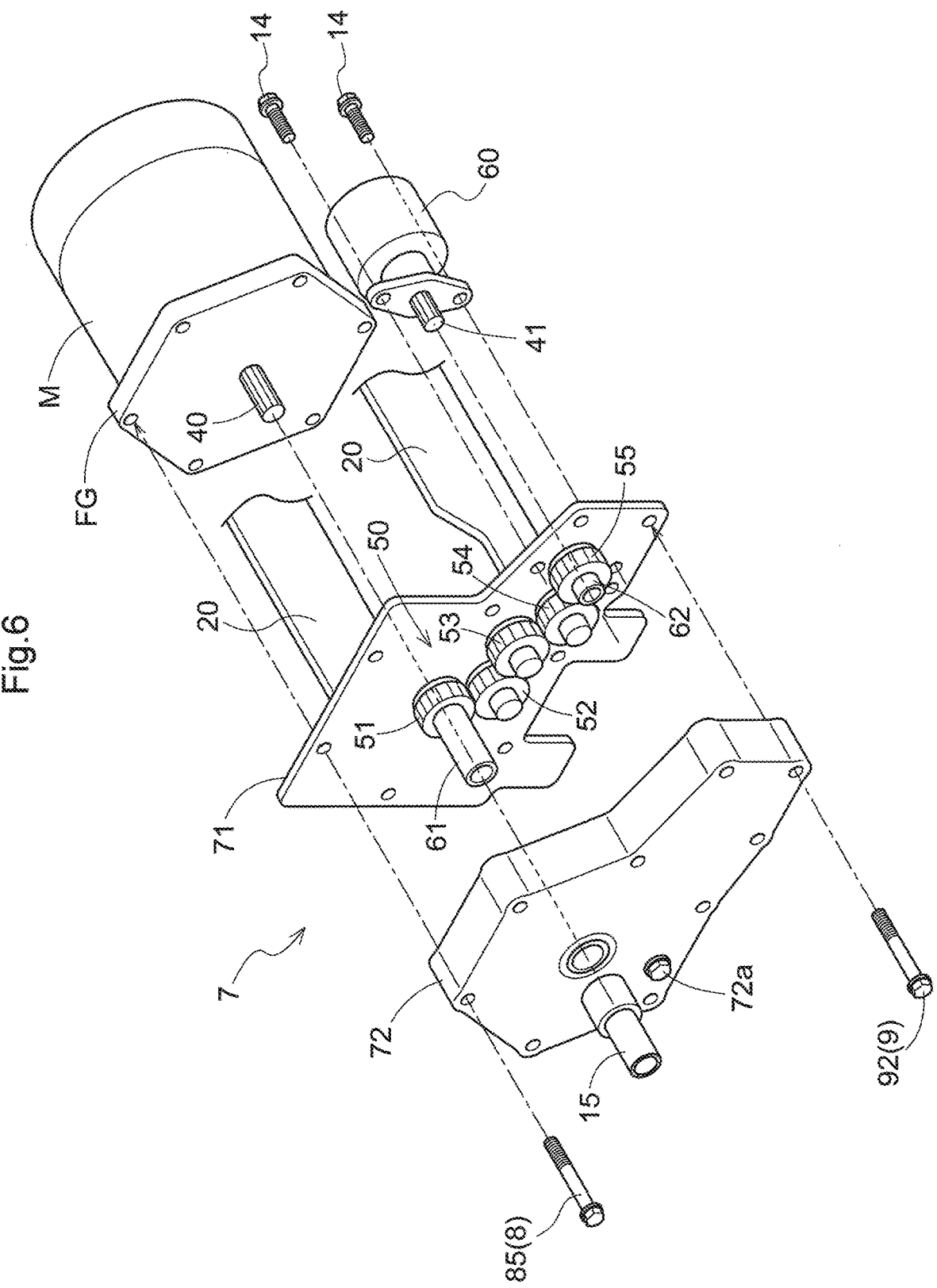

As shown in FIGS. 4 and 6, the tractor A includes a transmission device 50. The transmission device 50 transmits motive power from the motor M to the hydraulic pump 60.

In other words, the tractor A includes the transmission device 50 that transmits motive power from the motor M to the hydraulic pump 60.

More specifically, the transmission device 50 includes a first gear 51, a second gear 52, a third gear 53, a fourth gear 54, and a fifth gear 55. As shown in FIG. 4, these gears are arranged in the following order from the left side of the body: first gear 51, second gear 52, third gear 53, fourth gear 54, and fifth gear 55.

As shown in FIGS. 4 to 6, the first gear 51 is attached to the first cylindrical shaft 61. The first gear 51 rotates integrally with the first cylindrical shaft 61. Also, the first gear 51 and the second gear 52 are meshed with each other.

The second gear 52 and the third gear 53 are meshed with each other. Also, the third gear 53 and the fourth gear 54 are meshed with each other. Moreover, the fourth gear 54 and the fifth gear 55 are meshed with each other.

As shown in FIGS. 4 and 6, the fifth gear 55 is attached to a second cylindrical shaft 62. Also, the fifth gear 55 is attached to the second cylindrical shaft 62. The fifth gear 55 rotates integrally with the second cylindrical shaft 62.

Here, a pump input shaft 41, which is the input shaft of the hydraulic pump 60, is inserted into the second cylindrical shaft 62 and spline-fitted with the second cylindrical shaft 62. Accordingly, the second cylindrical shaft 62 and the pump input shaft 41 integrally rotate together with the fifth gear 55.

Note that the pump input shaft 41 and the second cylindrical shaft 62 both extend in the front-rear direction of the body.

According to the above configuration, motive power from the motor M is transmitted to the pump input shaft 41 via the motor output shaft 40, the first cylindrical shaft 61, the first gear 51, the second gear 52, the third gear 53, the fourth gear 54, the fifth gear 55, and the second cylindrical shaft 62. The hydraulic pump 60 is thus driven.

In other words, the transmission device 50 is of a gear type.

As shown in FIGS. 2 to 6, the tractor A includes a case 7. The case 7 houses the first gear 51, the second gear 52, the third gear 53, the fourth gear 54, and the fifth gear 55.

In other words, the tractor A includes the case 7 that houses the transmission device 50.

The case 7 includes a first member 71 and a second member 72 that are adjacent to each other in the front-rear direction of the body. The first member 71 is formed as a plate arranged in a vertical orientation. The first member 71 supports the first cylindrical shaft 61, the second gear 52, the third gear 53, the fourth gear 54, and the second cylindrical shaft 62. The second member 72 is shaped as a box that is open in the forward direction.

The first member 71 is located on one side of the second member 72 in the front-rear direction of the body. More specifically, the first member 71 is located on the front side of the second member 72.

As shown in FIGS. 2, 3, and 6, other end portions of the left and right main frames 20 on the other side in the front-rear direction of the body are connected to an end portion of the first member 71 on the one side in the front-rear direction of the body. More specifically, rear end portions of the left and right main frames 20 are connected to a front end portion of the first member 71.

As shown in FIGS. 2 to 6, the second member 72 abuts against the first member 71 from the rear side. The tractor A also includes a plurality of motor-side fasteners 8 (corresponding to "fasteners") and a plurality of pump-side fasteners 9. The first member 71 and the second member 72 are coupled to each other by the motor-side fasteners 8 and the pump-side fasteners 9.

By removing the motor-side fasteners 8 and the pump-side fasteners 9, the second member 72 can be separated from the first member 71 toward the other side in the front-rear direction of the body. More specifically, the second member 72 can be separated rearward from the first member 71.

In other words, the second member 72 is separable from the first member 71 toward the other side in the front-rear direction of the body.

Note that the motor-side fasteners 8 may be bolts. However, the present invention is not limited to this, and the motor-side fasteners 8 may each include a bolt and a nut.

The pump-side fasteners 9 also may be bolts. However, the present invention is not limited to this, and the pump-side fasteners 9 may each include a bolt and a nut.

As shown in FIG. 4, in a rear view, the motor-side fasteners 8 are aligned in the circumferential direction of the motor output shaft 40, which is the output shaft of the motor M, and are centered around the motor output shaft 40. Also, the motor-side fasteners 8 each extend in the front-rear direction of the body and are inserted into corresponding bolt holes from the rear.

Note that in the present preferred embodiment, the distance between the motor-side fastener 8 and the motor output shaft 40 is the same for each motor-side fastener 8. In other words, the motor-side fasteners 8 are aligned on a circle centered around the motor output shaft 40. However, the present invention is not limited to this. The distance between the motor-side fastener 8 and the motor output shaft 40 may differ among the motor-side fasteners 8.

The following is a detailed description of the motor-side fasteners 8. As shown in FIGS. 2 to 6, the tractor A includes a first fastener 81, a second fastener 82, a third fastener 83, a fourth fastener 84, a fifth fastener 85, and a sixth fastener 86. The first fastener 81, the second fastener 82, the third fastener 83, the fourth fastener 84, the fifth fastener 85, and the sixth fastener 86 are all motor-side fasteners 8.

Here, the motor M and the hydraulic pump 60 are located on the one side of the first member 71 in the front-rear direction of the body. More specifically, the motor M and the hydraulic pump 60 are located forward of the first member 71.

The motor M includes a flange FG. The flange FG is located in a rear portion of the motor M. As shown in FIG. 6, the flange FG is hexagonal in a view along the front-rear direction.

As shown in FIGS. 2 and 3, the flange FG abuts against the first member 71 from the front side. The motor-side fasteners 8 are arranged corresponding to the six corner portions of the flange FG.

More specifically, as shown in FIGS. 2 to 6, the first fastener 81 is inserted into the bolt hole at the rightmost corner portion of the flange FG. The second fastener 82 is inserted into the bolt hole at the lower right corner portion of the flange FG. The third fastener 83 is inserted into the bolt hole at the lower left corner portion of the flange FG. The fourth fastener 84 is inserted into the bolt hole at the leftmost corner portion of the flange FG. The fifth fastener 85 is inserted into the bolt hole at the upper left corner portion of the flange FG. The sixth fastener 86 is inserted into the bolt hole at the upper right corner portion of the flange FG.

According to this configuration, the motor-side fasteners 8 are provided so as to fasten together the motor M, the first member 71, and the second member 72. The case 7 is coupled to the motor M with this configuration.

According to the configuration described above, the first member 71 supports the motor M in a cantilevered state.

As shown in FIG. 4, the transmission device 50 passes through the space between the first fastener 81 and the second fastener 82. Here, the first fastener 81 and the second fastener 82 are adjacent to each other in the circumferential direction of the motor output shaft 40.

In this way, the transmission device 50 is arranged so as to pass through the space between two motor-side fasteners 8 that are adjacent to each other in the circumferential direction of the motor output shaft 40.

As shown in FIG. 6, the hydraulic pump 60 is secured to the first member 71 by a plurality of pump fixing bolts 14.

According to this configuration, the first member 71 supports the hydraulic pump 60 in a cantilevered state.

In other words, the hydraulic pump 60 is supported by the case 7. Also, the first member 71 supports the motor M in a cantilevered state and also supports the hydraulic pump 60 in a cantilevered state.

As shown in FIG. 4, the pump-side fasteners 9 are arranged around the pump input shaft 41. The pump-side fasteners 9 each extend in the front-rear direction of the body and are inserted into corresponding bolt holes from the rear.

As shown in FIGS. 2 to 6, the tractor A includes a first pump-side fastener 91, a second pump-side fastener 92, and a third pump-side fastener 93. The first pump-side fastener 91, the second pump-side fastener 92, and the third pump-side fastener 93 are all pump-side fasteners 9.

The first pump-side fastener 91 is located on the upper right side of the pump input shaft 41. The second pump-side fastener 92 is located on the lower right side of the pump input shaft 41. The third pump-side fastener 93 is located on the lower left side of the pump input shaft 41.

In the present preferred embodiment, oil is stored inside the case 7. Oil is also stored inside the speed change device T. As shown in FIG. 6, an oil discharge portion 72a is provided in a lower portion of the second member 72. During maintenance, by removing a drain bolt in the oil discharge portion 72a, the oil contained in the case 7 can be drained through the oil discharge portion 72a.

As shown in FIGS. 2 to 7, a connecting pipe 15 is connected to a lower portion of the second member 72. The connecting pipe 15 connects the second member 72 to the speed change device T. The connecting pipe 15 is also in communication with the space inside the case 7. The connecting pipe 15 is also in communication with the space inside the speed change device T. Accordingly, the connecting pipe 15 connects the space inside the case 7 to the space inside the speed change device T. This allows oil to move between the space inside the case 7 and the space inside the speed change device T.

Figure 7:
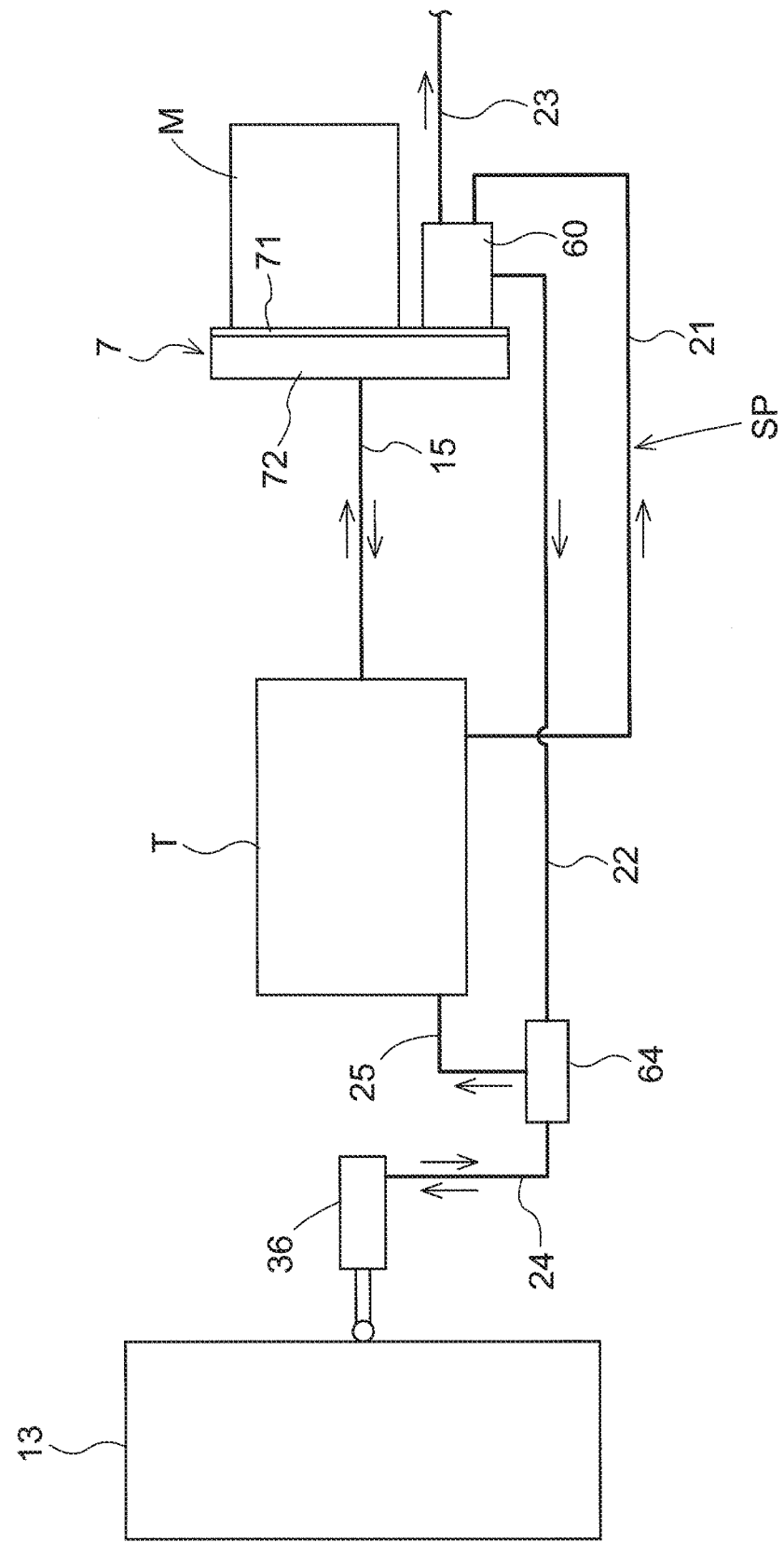
FIG. 7 is a schematic diagram showing a hydraulic system of the tractor.

As shown in FIG. 7, the tractor A includes a first oil channel 21, a second oil channel 22, a third oil channel 23, a fourth oil channel 24, a fifth oil channel 25, and an elevation control valve 64. In FIG. 7, the directions in which oil flows are indicated by arrows.

The first oil passage 21 connects the speed change device T and the hydraulic pump 60. The second oil passage 22 connects the hydraulic pump 60 and the elevation control valve 64. The third oil passage 23 connects the hydraulic pump 60 and a power steering mechanism (not shown). The fourth oil passage 24 connects the elevation control valve 64 and the elevation mechanism 36. The fifth oil passage 25 connects the elevation control valve 64 and the speed change device T.

The hydraulic pump 60 draws oil from the space inside the speed change device T through the first oil passage 21. In other words, oil that has moved from the space inside the case 7 to the space inside the speed change device T via the connecting pipe 15 is supplied to the hydraulic pump 60 via the first oil passage 21.

Here, an oil supply passage SP includes the connecting pipe 15, the speed change device T, and the first oil passage 21. The case 7 and the hydraulic pump 60 are connected by the oil supply passage SP.

In other words, the tractor A includes the oil supply passage SP that connects the case 7 and the hydraulic pump 60. Oil stored inside the case 7 passes through the oil supply passage SP and is supplied to the hydraulic pump 60.

The hydraulic pump 60 pumps the supplied oil to the second oil passage 22 and the third oil passage 23. The oil pumped to the second oil passage 22 is supplied to the elevation control valve 64. The oil pumped to the third oil passage 23 is supplied to the power steering mechanism. The power steering mechanism is operated by the oil supplied via the third oil passage 23.

The elevation control valve 64 controls the supply of oil to the elevation mechanism 36 and the discharge of oil from the elevation mechanism 36.

When oil is supplied from the elevation control valve 64 to the elevation mechanism 36 via the fourth oil passage 24, the elevation mechanism 36 operates in the upward direction. The cultivating device 13 thus rises.

When oil is discharged from the elevation mechanism 36 via the fourth oil passage 24, the elevation mechanism 36 operates in the downward direction. The cultivating device 13 is thus lowered.

The elevation control valve 64 is also configured to be capable of returning oil to the speed change device T via the fifth oil passage 25.

According to the configuration described above, the motor M and the case 7 are relatively close to each other. Also, the hydraulic pump 60 and the case 7 are relatively close to each other. For this reason, the motor M and the hydraulic pump 60 are relatively close to each other. Accordingly, the motive power transmission path from the motor M to the hydraulic pump 60 is relatively short. As a result, motive power transmission loss from the motor M to the hydraulic pump 60 is relatively small.

Also, with the configuration described above, the hydraulic pump 60 is supported by the case 7. For this reason, there is no need to provide a dedicated component in order to support the hydraulic pump 60. Accordingly, the manufacturing cost can be lower than in the case where a dedicated member is provided in order to support the hydraulic pump 60.

In other words, with the configuration described above, it is possible to realize the tractor A in which motive power transmission loss from the motor M to the hydraulic pump 60 is relatively small, and the manufacturing cost can be reduced.

Note that the preferred embodiment described above is merely an example, and rather than being limited to the above preferred embodiment, the present invention can be modified as appropriate.

Other Preferred Embodiments

The arrangement of some or all of the elements, portions, or features may be reversed in the left-right direction.

The arrangement of some or all of the elements, portions, or features may be reversed in the front-rear direction. For example, the first member 71 may be positioned rearward of the second member 72. Also, the motor M and the hydraulic pump 60 may be positioned rearward of the first member 71. Moreover, the second member 72 may be able to separated forward from the first member 71.

The tractor A may include an engine and be configured as a hybrid type of tractor.

The motor M may be arranged at a location other than between the left and right main frames 20. For example, the motor M may be arranged above the left and right main frames 20.

Instead of the cultivating device 13, the tractor may include a work device such as a loader or an excavator, or various types of devices such as a fertilizer spreading device, a chemical spreading device, a seeding device, or a harvesting device. In this case, the "work device" of the present invention corresponds to the work device such as a loader or an excavator, or the various types of devices such as a fertilizer spreading device, a chemical spreading device, a seeding device, or a harvesting device.

The motor M is not required to be supported in a cantilevered state.

The hydraulic pump 60 is not required to be supported in a cantilevered state.

The case 7 may be constituted by a single member.

In the above preferred embodiment, the motor M is supported by the case 7. However, the present invention is not limited to this, and the case 7 may be supported by the motor M.

In the above preferred embodiment, six motor-side fasteners 8 are provided. However, the present invention is not limited to this, and any other number of motor-side fasteners 8 may be provided.

In the above preferred embodiment, three pump-side fasteners 9 are provided. However, the present invention is not limited to this, and any other number of pump-side fasteners 9 may be provided.

Preferred embodiments of the present invention and modifications thereof are applicable not only to tractors but also to various types of electric work vehicles such as a combine harvester, a rice transplanter, or a construction work device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An electric work vehicle comprising:
a work implement;
a battery;
a motor to be driven by electric power supplied by the battery;
a traveler to be driven by the motor;
a speed change device to change a driving force from the motor and transmit the driving force as changed to the traveler;
a hydraulic pump to be driven by the motor to supply oil to an operating mechanism of the work implement;
a transmission to transmit motive power from the motor to the hydraulic pump; and
a case to house the transmission; wherein
the motor includes a motor output shaft;
the motor output shaft extends in a front-rear direction of a body of the electric work vehicle;
the motor and the hydraulic pump are located outside of the case;
the case is coupled to the motor;
the transmission is between the motor and the operating mechanism; and
the transmission transmits the motive power from the motor output shaft through a transmission path divided into a transmission path extending to the speed change device and a transmission path extending to the hydraulic pump.
2. The electric work vehicle according to claim 1, wherein the case includes a first portion and a second portion that are adjacent to each other in a front-rear direction of the body;

the first portion and the second portion are coupled to each other;

the first portion is located on one side in the front-rear direction of the body relative to the second portion;

the motor and the hydraulic pump are located on the one side in the front-rear direction of the body relative to the first portion; and the second portion is separable from the first portion toward another side in the front-rear direction of the body.

3. The electric work vehicle according to claim 2, further comprising:

left and right main frames that extend in the front-rear direction of the body; wherein the left and right main frames each include an end portion on the other side in the front-rear direction of the body, the end portions being connected to an end portion of the first portion on the one side in the front-rear direction of the body;

the motor is located at a position between the left and right main frames; and the first portion supports the motor in a cantilevered state and supports the hydraulic pump in a cantilevered state.

4. The electric work vehicle according to claim 2, further comprising:

a plurality of fasteners; wherein the fasteners each fasten together the motor, the first portion, and the second portion;

in a rear view, the fasteners are aligned in a circumferential direction of the motor output shaft, and are centered around the motor output shaft; and the transmission extends through a space between two of the fasteners that are adjacent to each other in the circumferential direction of the motor output shaft.

5. The electric work vehicle according to claim 1, wherein the transmission includes a gear; and the case is configured to store oil.

6. An electric work vehicle comprising:

a driver section;

a work implement;

a battery;

a motor to be driven by electric power supplied by the battery;

a traveler to be driven by the motor;

a speed change device to change a driving force from the motor and transmit the driving force as changed to the traveler;

a hydraulic pump to be driven by the motor to supply oil to an operating mechanism of the work implement;

a transmission to transmit motive power from the motor to the hydraulic pump; and a case to house the transmission; wherein the motor includes a motor output shaft;

the motor and the hydraulic pump are located outside of the case;

the case is coupled to the motor;

the hydraulic pump, the motor, and the case are located forward of the driver section; and the transmission transmits the motive power from the motor output shaft through a transmission path divided into a transmission path extending to the speed change device and a transmission path extending to the hydraulic pump.

7. The electric work vehicle according to claim 6, wherein the case includes a first portion and a second portion that are adjacent to each other in a front-rear direction of a body of the electric work vehicle;

the first portion and the second portion are coupled to each other;

the first portion is located on one side in the front-rear direction of the body relative to the second portion;

the motor and the hydraulic pump are located on the one side in the front-rear direction of the body relative to the first portion; and the second portion is separable from the first portion toward another side in the front-rear direction of the body.

8. The electric work vehicle according to claim 7, further comprising:

left and right main frames that extend in the front-rear direction of the body; wherein the left and right main frames each include an end portion on the other side in the front-rear direction of the body, the end portions being connected to an end portion of the first portion on the one side in the front-rear direction of the body;

the motor is located at a position between the left and right main frames; and the first portion supports the motor in a cantilevered state and supports the hydraulic pump in a cantilevered state.

9. The electric work vehicle according to claim 7, further comprising:

a plurality of fasteners; wherein the fasteners each fasten together the motor, the first portion, and the second portion;

in a rear view, the fasteners are aligned in a circumferential direction of the motor output shaft, and are centered around the motor output shaft; and the transmission extends through a space between two of the fasteners that are adjacent to each other in the circumferential direction of the motor output shaft.

10. The electric work vehicle according to claim 6, wherein the transmission includes a gear; and the case is configured to store oil.

11. An electric work vehicle comprising:

a work implement;

a battery;

a motor to be driven by electric power supplied by the battery;

a traveler to be driven by the motor;

a hydraulic pump to be driven by the motor to supply oil to an operating mechanism of the work implement;

a transmission to transmit motive power from the motor to the hydraulic pump; and a case to house the transmission; wherein the motor and the hydraulic pump are located outside of the case;

the case is coupled to the motor; and the transmission is between the motor and the operating mechanism.

12. The electric work vehicle according to claim 11, further comprising:

an oil supply passage that connects the case and the hydraulic pump; wherein the case is configured to store oil; and the oil stored in the case is supplied to the hydraulic pump via the oil supply passage.

13. The electric work vehicle according to claim 11, wherein the case includes a first portion and a second portion that are adjacent to each other in a front-rear direction of a body of the electric work vehicle;

the first portion and the second portion are coupled to each other;

the first portion is located on one side in the front-rear direction of the body relative to the second portion;

the motor and the hydraulic pump are located on the one side in the front-rear direction of the body relative to the first portion; and the second portion is separable from the first portion toward another side in the front-rear direction of the body.

\* \* \* \* \*